(12) United States Patent
Komaki et al.

(10) Patent No.: US 6,430,009 B1
(45) Date of Patent: Aug. 6, 2002

(54) MAGNETIC HEAD SHIELD POLE WITH NONMAGNETIC SEPARATION FILM BETWEEN TRANSITION PORTION AND SHIELD PORTION

(75) Inventors: Kenji Komaki; Naoto Matono; Ryuichiro Yoshizaki; Hirohiko Kamimura, all of Osaka (JP)

(73) Assignee: Read-Rite SMI Corporation, Osaka (JP)

( * ) Notice: Subject to any disclaimer, the term of this patent is extended or adjusted under 35 U.S.C. 154(b) by 0 days.

(21) Appl. No.: 09/543,059

(22) Filed: Apr. 5, 2000

(30) Foreign Application Priority Data

May 6, 1999 (JP) .............................. 11-125707

(51) Int. Cl.$^7$ .............................. G11B 5/10; G11B 5/39; G11B 5/31

(52) U.S. Cl. ...................... 360/319; 360/317; 360/126; 360/128

(58) Field of Search .................. 360/317, 319, 360/128, 126

(56) References Cited

U.S. PATENT DOCUMENTS

| | | | | |
|---|---|---|---|---|
| 5,555,147 A | * | 9/1996 | Maruyama | |
| 5,739,991 A | * | 4/1998 | Matono et al. | 360/126 |
| 5,838,521 A | * | 11/1998 | Ravipati | |
| 5,949,625 A | * | 9/1999 | Sato et al. | 360/126 |
| 6,156,375 A | * | 12/2000 | Hu et al. | |

* cited by examiner

Primary Examiner—Craig A. Renner
(74) Attorney, Agent, or Firm—Burgess & Bereznak, LLP

(57) ABSTRACT

A compound thin film magnetic head in which the upper shield of the readout MR head also serves as the lower magnetic film of the write inductive head. The upper shield has a layered structure including a shield part of soft magnetic material functioning as a shield to magnetically shield the MR head, a lower pole part and transition part of soft magnetic material functioning as a write magnetic pole opposing the upper pole of the inductive head, and a nonmagnetic separation layer to magnetically separate these. Between the lower pole part and the transition part, an additional nonmagnetic separation layer can be provided. The shield part can be configured from multiple magnetic films formed in layers and enclosing a nonmagnetic separation layer.

4 Claims, 3 Drawing Sheets

MAGNETIC HEAD SHIELD POLE WITH NONMAGNETIC SEPARATION FILM BETWEEN TRANSITION PORTION AND SHIELD PORTION

BACKGROUND OF THE INVENTION

1. Field of the Invention

This invention concerns a compound inductive/MR type thin film magnetic head, provided integrally with an inductive head for writing and a magnetoresistive (MR) head for reading, and used for example in hard disk devices and in other recording and playback devices of various electronic equipment such as computers and word processors.

2. Background Information

In recent years, thin film magnetic heads employing magnetic materials with high saturation flux densities have been widely adopted in order to increase capacities and raise densities in magnetic recording. In particular, recently efforts have been made to further raise recording densities, reduce device sizes and raise output by means of compound type thin film magnetic heads, which adopt for dedicated writing an inductive head frequently used in the past for both reading and writing, and integrate with this an MR head for dedicated reading which has a high reproduction sensitivity and the reproduction output of which is independent of the relative velocity of the recording media.

In early compound thin film magnetic heads, the lower magnetic film of the inductive head for writing and the upper shield of the MR head for reading were separated magnetically from each other by a relatively thick nonmagnetic insulating layer, as described in examined patent application Sho58-36406. In general, thin film magnetic heads are provided in a slider supported at the tip of a suspension arm, and are used in a state of flight in proximity to the surface of a rotating magnetic disc. Here changes occur in the skew angle at outer circumferences and inner circumferences of the rotating magnetic disc; in order to alleviate this difficulty, it is desirable that the write gap and the read gap be brought into as close proximity as possible. Hence it was proposed that a compound type head be used, with a structure in which the upper shield of the MR head also serves as the lower magnetic film of the inductive head, as described for instance in laid-open patent application Hei7-296331.

However, there is the problem that in this structure the width of the lower pole of the inductive head is extremely large compared with the upper pole width, so that considerably large side fringes occur during recording, and limits are placed on the reduction of the track width. Hence in laid-open patent applications Hei7-262519 and Hei10-143817 and elsewhere, a structure is adopted in which the upper pole of the inductive head and the rectangular-shape protrusion below the magnetic gap film, that is, the lower pole part, are formed with their side walls positioned in vertical alignment to have the same track width, so that while maintaining the function as the upper shield of the MR element, side fringes are minimized, and off-track characteristics are improved.

In general, an upper shield having a lower pole part consisting of such a rectangular protrusion can be formed such that the track width of the upper pole, magnetic gap film and lower pole part are equal, by using ion milling to partially remove the magnetic film on both sides using the upper pole as a mask, or by using a frame plating method for formation in layers of the lower pole part on top of the magnetic film to function as the upper shield of the MR head. Normally ion milling is performed in two stages, first at a certain angle with respect to the side walls of the upper pole, and preferably at an irradiation angle close to the perpendicular, as described in both the aforementioned patent publications, after which the irradiation angle is changed to a more oblique direction.

By thus performing ion milling with the ion irradiation angle changed in two stages, the aforementioned protrusion which becomes the lower pole part can be made more nearly rectangular, and its side walls can be aligned with the side walls of the upper pole, while at the same time magnetic film material which has again adhered to the side walls of the upper pole, the magnetic gap film and the lower pole part can be removed. Further, in laid-open patent application Hei10-143817, by means of a second ion milling in which the irradiation angle is made more oblique inclined faces are formed on the upper faces on both sides of the protrusion; this part is more distant from the upper pole than in the prior art, so that there is the advantage that side fringes are not formed as easily.

In addition, in laid-open patent application Hei8-129720 is described a compound type thin film magnetic head in which the lower core layer of the inductive head and the upper shield layer of the MR head are formed integrally or else formed integrally with an intervening nonmagnetic thin film, in order to alleviate the problem in which, as the track width is made more narrow, closure domains grow larger in the magnetic core layer of the inductive head near the face opposing the recording media, reducing the recording performance. In the upper shield layer/lower core layer, the convex part corresponding to the lower core layer with planar shape approximately the same as the upper core layer of the inductive head, and the base part corresponding to the upper shield layer of the MR head with a wider planar shape, are magnetostatically coupled, and by this means the occurrence of closure domains in the vicinity of the surface opposing the recording media is suppressed, the effective permeability is raised, and recording performance can be improved. The convex part of the upper shield layer is formed into a flat shape approximately equal to the upper core layer by means of etching of the magnetic thin film according to a resist pattern formed on top of the latter.

However, in the upper shield of the compound magnetic head of the prior art described above, there is the problem that the part functioning as the lower pole of the inductive head for writing and the part functioning as the upper shield of the MR head are not clearly separated, so that the write magnetic field generated between the upper and lower poles of the inductive head cannot be adequately shielded, and the magnetization state of the MR film easily becomes unstable. In particular, it is undesirable for the domains to change from the position at which the planar shape of the upper shield changes, such as for example between the protrusion of the lower pole part and the part below this, or the inclined-face parts on both sides of the protrusion and the part below this. Otherwise there is the concern that noise and waveform distortion may occur in the reproduction signal, reducing the reproduction performance of the MR head and detracting from reliability.

SUMMARY OF THE INVENTION

A compound thin film magnetic head is disclosed. In one embodiment, the compound thin film magnetic head includes a substrate and an inductive head on the substrate for writing. The inductive head includes a conducting coil and an insulating layer formed in layers between an upper magnetic film and a lower magnetic film. The compound thin film magnetic head further includes a magnetoresistive head for reading. The magnetoresistive head includes a magnetoresistive element enclosed between the lower magnetic film serving as an upper shield and a lower shield. A lower power pole part is included in the upper shield, having a protrusion on a side of the inductive head opposing an upper pole of an upper magnetic film tip with a magnetic gap layer in between. An upper shield part is included on a side of the magnetoresistive head that is wider than the lower pole part. A nonmagnetic separation film is provided at a position of the upper shield part at which a planar shape of the upper shield part changes.

EXPLANATION OF SYMBOLS

Figure 1:
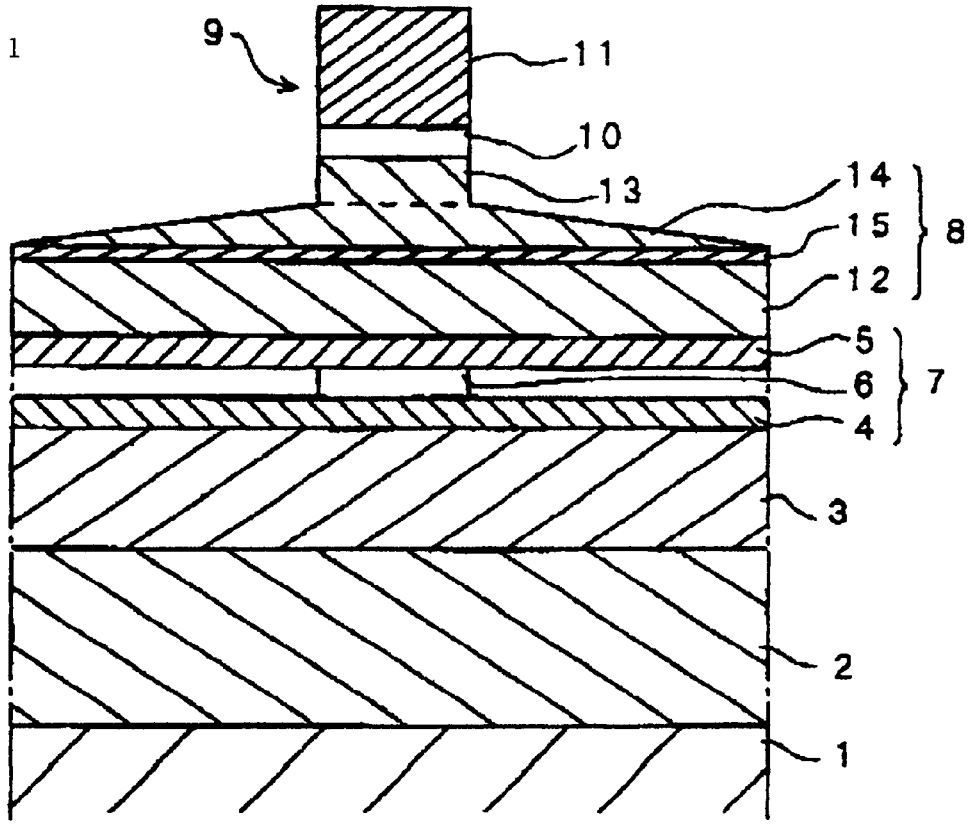
FIG. 1 is a cross-sectional diagram of a first example of a compound thin film magnetic head of this invention, as seen from the ABS (air bearing surface) side.

1 Substrate
2 Insulating layer
3 Lower shield
4 Lower insulating layer
5 Upper insulating layer
6 MR element
7 MR head
8 Upper shield
9 Inductive head
10 Magnetic gap film
11 Upper magnetic film
12 Shield layer
$12_1$, $12_2$ Magnetic film
13 Lower pole part
14 Transition part
15 to 17 Nonmagnetic separation layer

DETAILED DESCRIPTION

This invention was devised in light of the problems of the prior art described above. One aspect of this invention provides a compound thin film magnetic head that is able to adequately shield the write magnetic field generated by the inductive head via the upper shield, thereby stabilizing the operation of the MR head, reducing noise in the reproduction signal and alleviating distortion in the reproduction output waveform, and improving reproduction performance.

In one embodiment, the compound thin film magnetic head of this invention is provided on a substrate with an inductive head for writing in which a conducting coil and insulating layer are formed in layers between an upper magnetic film and a lower magnetic film, and a magnetoresistive head for reading in which a magnetoresistive element is enclosed between the aforementioned lower magnetic film also serving as an upper shield and a lower shield; it is characterized by the fact that the aforementioned upper shield has a lower pole part consisting of a protrusion on the side of the aforementioned inductive head opposing the upper pole of the aforementioned upper magnetic film tip with magnetic gap layer in between, an upper shield part on the side of the aforementioned magnetoresistive head which is wider than the aforementioned lower pole part, and a nonmagnetic thin film provided at the position at which its planar shape changes.

By means of this nonmagnetic separation film, the upper shield of this invention is clearly divided into a part which functions as the lower pole which is one of the write magnetic poles of the inductive head, and a part which functions as the upper shield of the MR head, so that the write magnetic field from the inductive head can be shielded, and moreover effects due to changes in domains on the upper and lower sides of the nonmagnetic separation film can be eliminated, as a result of which disturbances of the MR head due to the write magnetic field can be reduced. Further, it is sufficient if the aforementioned nonmagnetic separation film is provided at least in the vicinity of the face opposing the recording media on which the write field acts, but it may be provided over the entire surface of the upper shield, and this is advantageous from the standpoint of manufacturing processes.

In a certain real example, the aforementioned nonmagnetic separation film is provided between the lower pole part of the upper shield and the part below this, by which means the write magnetic field shielding effect can be heightened, as is expedient.

In another real example, the aforementioned upper shield has a transition part in which the planar shape changes between the lower pole part and the upper shield part, similarly to the part described above in relation to laid-open patent application Hei10-143817 in which there are inclined faces on both sides of the lower pole part. The nonmagnetic separation film is provided between this transition part and the upper shield part, and by this means the part functioning as the upper shield of the MR head is reliably separated magnetically from the lower pole side, to shield the write magnetic field.

In still another real example, the aforementioned upper shield part consists of multiple magnetic films formed in layers enclosing a nonmagnetic separation film, by which means the advantage is gained that the function as the upper shield of the MR head can be made more stable.

FIG. 1 shows the first preferred real example of an inductive/MR compound thin film magnetic head to which this invention is applied. In this compound thin film magnetic head are provided, on top of a substrate 1 of an alumina-titanium carbide ($Al_2O_3$—TiC) ceramic material, an alumina, Si or other insulating layer 2 and a lower shield 3 of permalloy alloy, a cobalt-base alloy, iron-base Sendust alloy or other soft magnetic material formed by plating, vacuum evaporation or sputtering; on top of this is formed the readout MR head 7, consisting of an MR element 6 enclosed between a lower insulating layer 4 and an upper insulating layer 5. The MR element 6 consists, for example, of a spin-valve, dual-layer spin-valve or other giant magnetoresistance (GMR) effect element or of a TMR element using the perpendicular GMR effect, or of some other reproduction element using a magnetoresistance effect.

On top of the upper insulating layer 5 is formed by layering the upper shield 8 of this invention, and the write inductive head 9 is formed with this as the lower magnetic film. As in the prior art, this inductive head 9 has an upper magnetic film having at its tip an upper pole 11 which opposes the lower pole at the tip of the lower magnetic film 8, with a magnetic gap film 10 consisting of alumina enclosed between, and a conducting coil and interlayer insulating layer formed in layers between the two aforementioned magnetic films.

The upper shield 8 in this real example consists of a wide shield layer 12 which functions primarily as the upper shield of the MR element 6, and the protrusion matched to the same track width as the upper pole 11. The lower pole part 13 which functions as the lower pole of the inductive head, and the transition part 14 the width of which gradually decreases in moving from the shield layer 12 to the lower pole part 13, are formed from soft magnetic material. Between the shield layer 12 and the transition part 14 is provided a nonmagnetic separation layer 15 consisting of alumina, tantalum oxide or some other oxide and Ta, Ti, Cu or some other metal thin film, with the same planar shape as the shield layer 6.

The upper shield 8 with this layered structure is formed by first depositing, on top of the upper insulating layer 5, the shield layer 12 and nonmagnetic separation layer 15, then forming in layers the soft magnetic material on top, and using ion milling with either the upper pole 11 or a photoresist layer formed on top of it as a mask to remove the soft magnetic material on both sides of the lower pole part 13, similar to the process of the prior art. The ion milling is performed in two stages, with the ion irradiation angle in a near-perpendicular direction and at an oblique angle. Here the action of the shadow of the upper pole serving as the mask and the oblique irradiation angle cause both side parts of the lower pole part 13 to be etched until both ends reach the upper face of the nonmagnetic separation layer 15, to form a transition part 14 which is gently inclined from the lower pole part 13 to both ends.

In this real example, by forming the upper shield 8 in a structure consisting of layered formation of a thin nonmagnetic separation layer 15 and soft magnetic material layers 12 to 14, the write magnetic field from the inductive head 9 acting on the MR head side is effectively shielded, and noise in the reproduction signal or distortion in the reproduction output waveform can be reduced, while maintaining the effect by which the influence of blurring due to side fringes of the magnetic field during recording is decreased.

Figure 2:
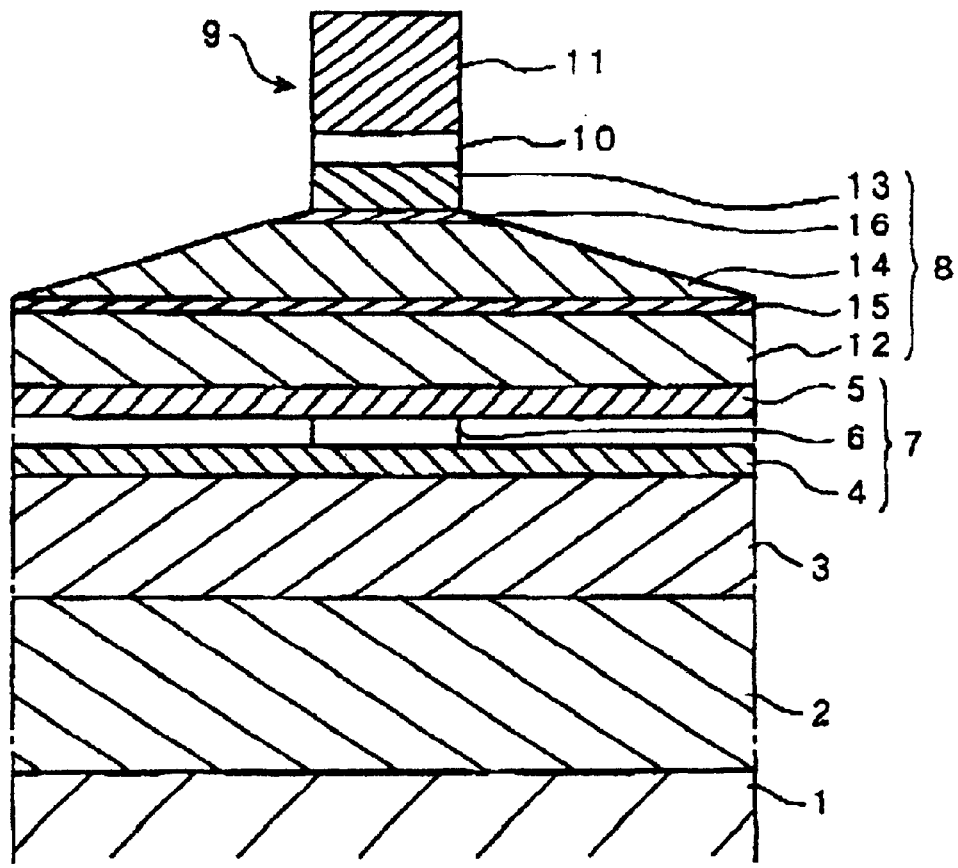
FIG. 2 is a cross-sectional diagram of a second example of this invention, as seen from the ABS side.

FIG. 2 shows a second preferred real example of a compound thin film magnetic head to which this invention is applied. In this second real example, the upper shield 8 differs from that of the first real example of FIG. 1 in that, between the lower pole part 13 and transition part 14, as with the nonmagnetic separation layer 15, a nonmagnetic separation layer 16 consisting of alumina, tantalum oxide or some other oxide material and Ta, Ti, Cu, or some other metal film is added. By means of this added nonmagnetic separation layer 16, the effect of shielding the write magnetic field can be further increased.

In a certain real example, the lower pole part 13 and transition part 14 and the shield layer 12 can be formed of soft magnetic materials with different respective compositions. The compositions of each of the soft magnetic materials are chosen appropriately in consideration of their functions as write magnetic poles or as shields.

Figure 3:
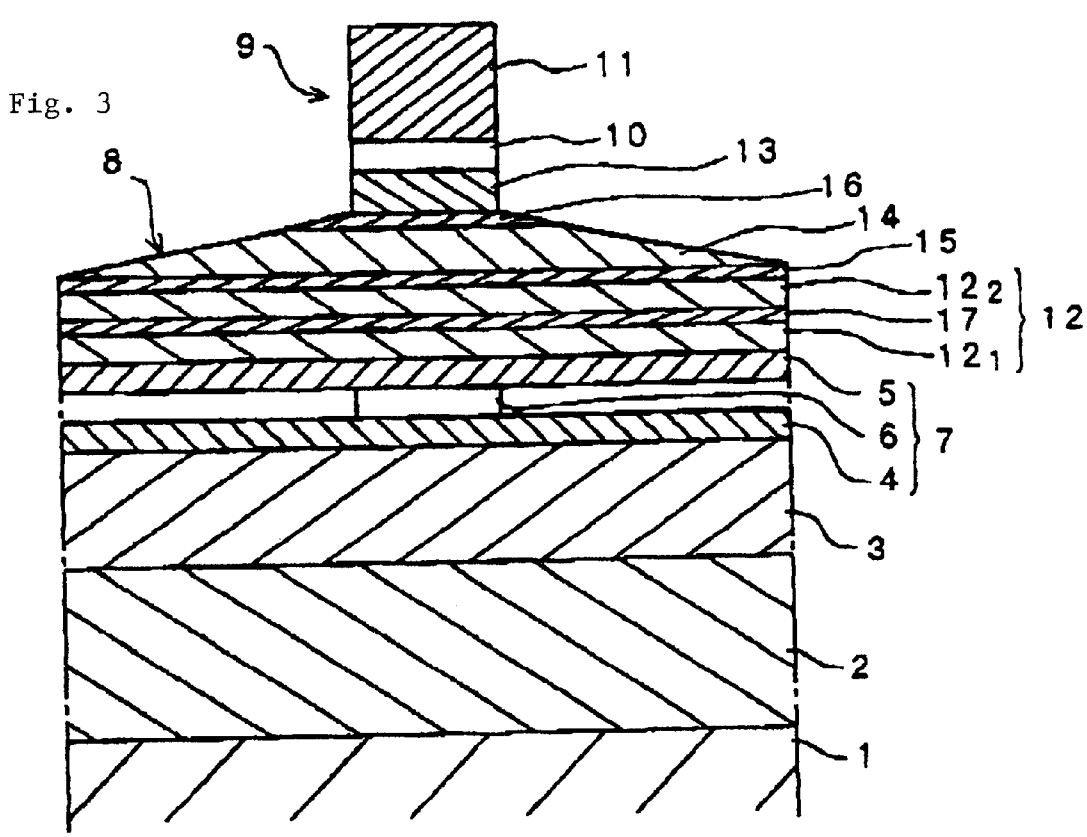
FIG. 3 is a Cross-sectional diagram of a third example of this invention, as seen from the ABS side.

FIG. 3 shows a preferred third real example of a compound thin film magnetic head to which this invention is applied. In this third real example, the upper shield 8 differs from that of the second real example of FIG. 2 in that the shield layer 12 has a layered structure in which a first magnetic layer 12, and second magnetic layer 12₂ enclose a similar nonmagnetic separation layer 17 consisting of alumina, tantalum oxide or other oxide and Ta, Ti, Cu or other metal film. By thus adopting a layered structure for the upper shield 8, its function as a shield can be made more stable.

In each of the real examples of FIGS. 1 through 3, the reproduction output fluctuation (ACOV) when application of a write magnetic field and reproduction of the magnetoresistive effect element are repeated was measured. In the first real example, the thickness of the shield layer 12 was 1.0 $\mu$m, the thickness of the nonmagnetic separation layer 15 was 0.05 $\mu$m, and the total thickness of the lower pole part 13 and transition part 14 was 1.5 $\mu$m. In the second real example, the thickness of the transition part 14 was 1 $\mu$m, the thickness of the nonmagnetic separation layer 16 was 0.05 $\mu$m, and the thickness of the lower pole part 13 was 0.5 $\mu$m. In the third real example, the thickness of the nonmagnetic separation layer 17 was 0.05 $\mu$m, and the thicknesses of the first and second magnetic layers $12_1$, $12_2$ were both 0.5 $\mu$pm.

For comparison, the reproduction output fluctuation was also measured for a compound thin film magnetic head as described in laid-open patent application Hei10-143817 with a single-layer structure having a protrusion of the prior art and a 2.5 $\mu$m upper shield. As a result, whereas the ACOV of the magnetic head with structure of the prior art was 1.5%, the ACOV of the first through third real examples were 1.0%, 0.7%, and 0.5% respectively, indicating a substantial improvement in reproduction performance.

In the above the details of preferred real examples of this invention have been explained; however, various modifications and alterations can be added to the aforementioned real examples, within the technical limits of this invention. For example, the shield layer 12 of FIG. 1 can be formed with the layered structure of the third real example. Or, the shield layer 12 of the third real example can be formed in a multilayer structure having multiple nonmagnetic separation layers.

By means of the structure of this invention as described above, the following advantageous results are obtained.

In the compound thin film magnetic head of this invention, the upper shield is given a layered structure of a nonmagnetic separation film provided at the position at which the planar shape changes and magnetic film, to clearly separate the part functioning as the lower pole of the inductive head and the part functioning as the upper shield of the MR head. By this means the write field generated by the inductive head is adequately shielded, and moreover the effect of changes in domains from the position at which the planar shape changes can be eliminated, so that disturbances to the readout MR head by the write magnetic field are reduced, and the MR head can always operate in a stable state, noise in the reproduction signal and distortion in the reproduction output waveform can be reduced, and the reproduction performance can be improved.

What is claimed is:

1. A compound thin film magnetic head, comprising:
    a substrate;
    an inductive head on the substrate for writing, the inductive head including a gap layer disposed between an upper magnetic film, which functions as an upper pole, and a lower magnetic film;
    a magnetoresistive head for reading, the magnetoresistive head including a magnetoresistive element disposed between an upper shield and a lower shield;
    the lower magnetic film including a shield layer, which functions primarily as the upper shield of the magnetoresistive head, a transition part, and a lower pole part disposed adjacent the gap layer and having a width matched to the upper pole, the lower pole part functioning as a lower pole of the inductive head, the transition part gradually decreasing in width from the shield layer to the lower pole part; and
    a first nonmagnetic separation layer disposed between the shield layer and the transition part.

2. The compound thin film magnetic head of claim 1, further comprising:

a second nonmagnetic separation film provided between the lower pole part and the transition part.

3. The compound thin film magnetic head of claim 2, wherein the shield layer comprises:

a first magnetic layer;

a second magnetic layer; and a third nonmagnetic separation layer disposed between the first and second magnetic layers.

4. A compound thin film magnetic head comprising:

an inductive head that includes a gap layer disposed between an upper magnetic film, which functions as an upper pole, and a lower magnetic film, a plurality of nonmagnetic separation layers being disposed in the lower magnetic film;

a magnetoresistive head that includes a magnetoresistive element disposed between an upper shield and a lower shield;

the lower magnetic film including a shield layer, which functions primarily as the upper shield of the magnetoresistive head, a transition part, and a lower pole part disposed adjacent the gap layer and having a width matched to the upper pole, the lower pole part functioning as a lower pole of the inductive head, the transition part gradually decreasing in width from the shield layer to the lower pole part; and wherein one of the nonmagnetic separation layers is disposed between the shield layer and the transition part.

* * * * *